US009050532B2

(12) United States Patent
Sakurai et al.

(10) Patent No.: US 9,050,532 B2
(45) Date of Patent: Jun. 9, 2015

(54) COMPUTER-READABLE STORAGE MEDIUM HAVING STORED THEREIN STEREOSCOPIC DISPLAY CONTROL PROGRAM, STEREOSCOPIC DISPLAY CONTROL SYSTEM, STEREOSCOPIC DISPLAY CONTROL APPARATUS, AND STEREOSCOPIC DISPLAY CONTROL METHOD

(75) Inventors: Masahiro Sakurai, Chiyoda-ku (JP); Satoshi Kodaira, Chiyoda-ku (JP); Taichi Machino, Chiyoda-ku (JP)

(73) Assignee: NINTENDO CO., LTD., Kyoto (JP)

( * ) Notice: Subject to any disclaimer, the term of this patent is extended or adjusted under 35 U.S.C. 154(b) by 862 days.

(21) Appl. No.: 13/239,974

(22) Filed: Sep. 22, 2011

(65) Prior Publication Data
US 2012/0075429 A1  Mar. 29, 2012

(30) Foreign Application Priority Data

Sep. 28, 2010 (JP) ................................ 2010-217569

(51) Int. Cl.
*H04N 13/02* (2006.01)
*A63F 13/40* (2014.01)
*H04N 13/00* (2006.01)

(52) U.S. Cl.
CPC .......... *A63F 13/10* (2013.01); *A63F 2300/6615* (2013.01); *A63F 2300/6669* (2013.01); *A63F 2300/6684* (2013.01); *A63F 2300/6692* (2013.01); *H04N 13/004* (2013.01); *H04N 13/0275* (2013.01)

(58) Field of Classification Search
CPC ............ A63F 13/10; A63F 2300/6615; A63F 2300/6669; A63F 2300/6684; A63F 2300/6692
See application file for complete search history.

(56) References Cited

U.S. PATENT DOCUMENTS

| 7,371,163 | B1 * | 5/2008 | Best | .................................. 463/1 |
| 2004/0066555 | A1 * | 4/2004 | Nomura | ........................ 359/462 |
| 2008/0043022 | A1 | 2/2008 | Ishihara | |
| 2008/0246759 | A1 * | 10/2008 | Summers | ...................... 345/420 |

FOREIGN PATENT DOCUMENTS

| JP | 2003-107603 | 4/2003 |
| JP | 2008-43589 | 2/2008 |

* cited by examiner

*Primary Examiner* — Sath V Perungavoor
*Assistant Examiner* — Peter D Le
(74) *Attorney, Agent, or Firm* — Nixon & Vanderhye PC

(57) ABSTRACT

A game apparatus 10 shoots a virtual space in which a virtual object (player object 74, non player object 75, construction object 76, or the like) is present, with a right virtual camera and a left virtual camera, thereby generating an image for a right eye and an image for a left eye, and outputs the image for a right eye and the image for a left eye to an LCD in a stereoscopically visible manner. At this time, if the player object 74 is close to the virtual cameras, the player object 74 is displayed as a silhouette image.

19 Claims, 11 Drawing Sheets

F I G. 2
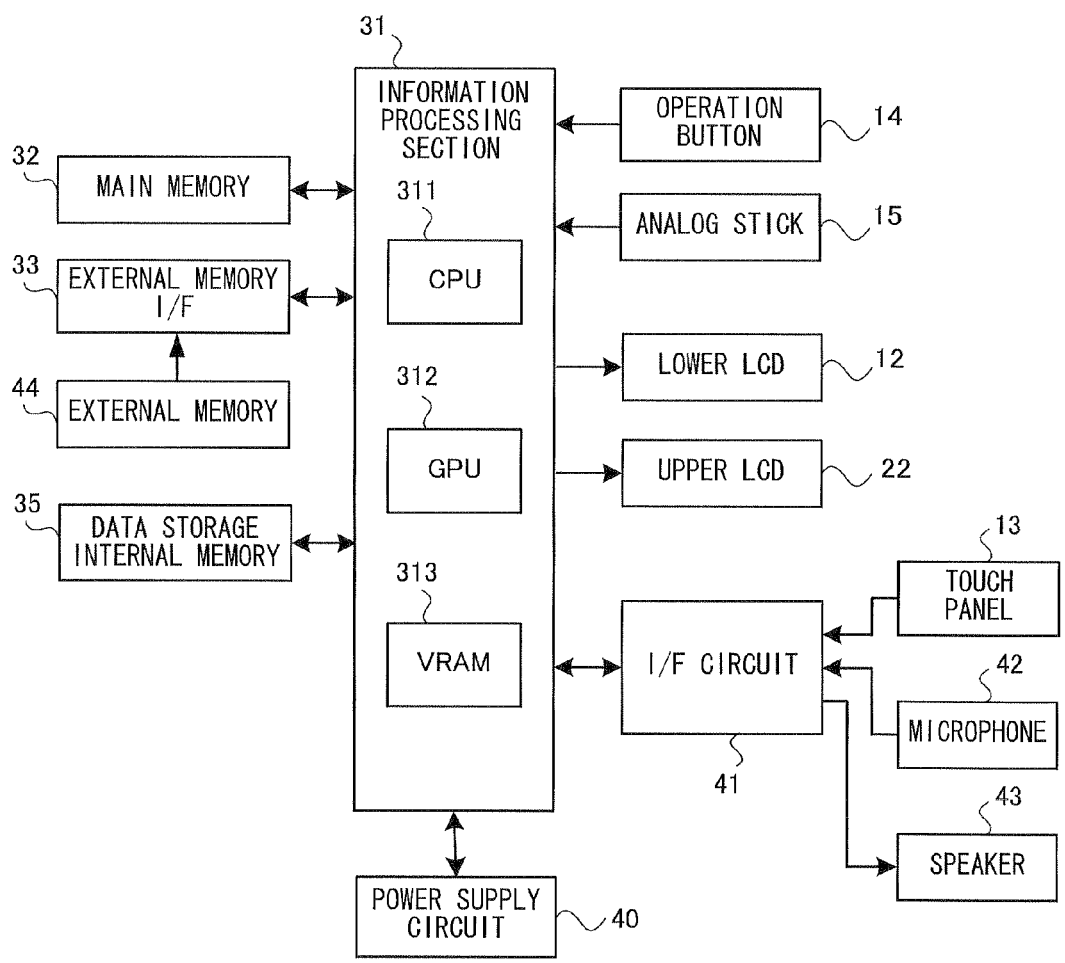

(a)

(b)

F I G. 4
(a)
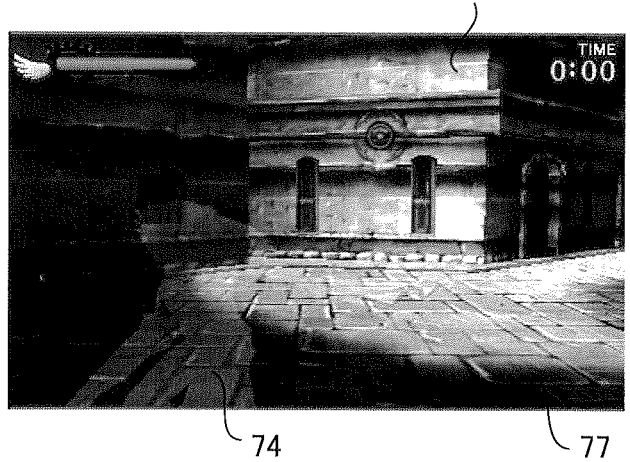
(b)
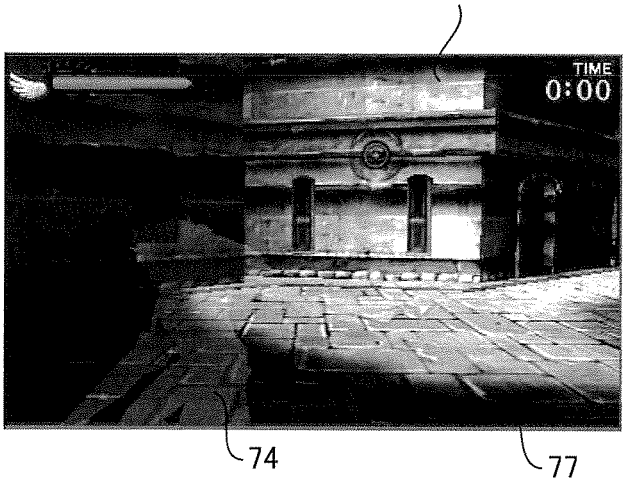

COMPUTER-READABLE STORAGE MEDIUM HAVING STORED THEREIN STEREOSCOPIC DISPLAY CONTROL PROGRAM, STEREOSCOPIC DISPLAY CONTROL SYSTEM, STEREOSCOPIC DISPLAY CONTROL APPARATUS, AND STEREOSCOPIC DISPLAY CONTROL METHOD

CROSS REFERENCE TO RELATED APPLICATION

The disclosure of Japanese Patent Application No. 2010-217569, filed on Sep. 28, 2010, is incorporated herein by reference.

FIELD

The exemplary embodiments described herein relate to: a computer-readable storage medium having stored therein stereoscopic display control program executed by an apparatus or a system that is capable of generating images providing a stereoscopic view and outputting the images to a predetermined display; a stereoscopic display control system; a stereoscopic display control apparatus; and a stereoscopic display control method.

BACKGROUND AND SUMMARY

Conventionally, there has been known a method of providing a stereoscopic view by using images having a predetermined parallax. Such a method of stereoscopic view is getting applied to a variety of fields. For example, applications for displaying a 3-dimensional virtual space, such as games or CG animations, have been developed.

In such a conventional application as described above, an object present at a predetermined position in a virtual space is drawn so as to appear to be on a display surface. In addition, an object present at a position closer to a virtual camera than the predetermined position is drawn so as to appear to protrude forward from the display surface, and an object present at a position farther from a virtual camera than the predetermined position is drawn so as to appear to be retracted backward from the display surface.

An object of the exemplary embodiments described herein is to provide a computer-readable storage medium having stored therein stereoscopic display control program, a stereoscopic display control system, a stereoscopic display control apparatus, and a stereoscopic display control method that are capable of generating a stereoscopic image easily viewable.

The first aspect of the exemplary embodiments is to provide a computer-readable storage medium having stored therein a program that causes a computer to function as display controller configured to, based on a predetermined viewpoint, generate an image for a right eye and an image for a left eye with respect to a predetermined virtual space in which a predetermined virtual object (e.g., a player object, a non-player object, a construction object, or a geography object) is present, and output the image for a right eye and the image for a left eye to a predetermined display in a stereoscopically visible manner. The display controller generates an image for a right eye and an image for a left eye of a proximity object which is a virtual object present at less than a predetermined distance from a viewpoint for drawing the virtual space, such that the proximity object is displayed in a simplified manner. The simplified display manner is, for example, to display an object as a silhouette image as described later. Besides this, any display manner may be employed as long as an object is displayed in a simpler manner than a "display manner for an object present at more than the predetermined distance from the viewpoint" (standard display manner). For example, in the simplified display manner, an object may be displayed as an image with decreased colors, a line image, an image with a decreased resolution, or a silhouette image (an image with a single color) as described later. The color strength of the silhouette image may be uniform. Image data for the simplified display manner may be generated from image data for the standard display manner, or may be stored in advance as separate image data. The simplified display manner may use simplified textures or simplified models. For example, as described later, the proximity object may be rendered with a texture for the silhouette display manner, instead of using a texture for the standard display manner. The predetermined distance may be a distance that allows an object to appear to protrude from the display surface, or may be a distance that allows an object to appear to be on the display surface (a distance that allows the display positions of an image for a right eye and an image for a left eye on the display to coincide with each other). Alternatively, considering a margin, the predetermined distance may be a distance that allows an object to appear to be retracted backward from the display surface. Typically, the display controller places two virtual cameras in the virtual space, and shoots the virtual space with the two virtual cameras, thereby generating an image for a right eye and an image for a left eye. Typically, the two virtual camera are set in the same shooting direction. Alternatively, the two virtual cameras may be set in cross directions.

A virtual object present at less than the predetermined distance from the viewpoint for drawing the virtual space is referred to as a proximity object. A virtual object present at more than the predetermined distance from the viewpoint for drawing the virtual space is referred to as a non-proximity object.

It is noted that not all virtual objects present at less than the predetermined distance from the viewpoint for drawing the virtual space need to be displayed in a simplified manner.

Stereoscopic images that appear to protrude toward a user can be difficult to view. However, according to the first aspect of the exemplary embodiments, an image for a right eye and an image for a left eye of a virtual object present at a position that allows the virtual object to appear to protrude are simplified, whereby the difference between the image for a right eye and the image for a left eye is decreased. Thus, it is possible to generate images easily viewable.

In addition, the display controller may decrease the difference between the display positions on the display of the image for a right eye and the image for a left eye of the proximity object, as well as displaying the proximity object in a simplified manner as described above. It is noted that the difference between the display positions may be decreased to zero. Processing for decreasing the difference between the display positions on the display of an image for a right eye and an image for a left eye may be performed (1) in processing of generating images of a proximity object, (2) in processing of superimposing images of a proximity object onto images of a non-proximity object, or (3) in processing of outputting images of a proximity object to the display. In the case (1), typically, the setting of the virtual cameras is changed from the setting for proximity object to the setting for non-proximity object, as described above. In the case (2), in the processing of superimposing images of a proximity object onto images of a non-proximity object, the difference between the display positions of the images of the proximity object is decreased, and then the images of the proximity object are superimposed onto the images of the non-proximity object. In the case (3), when images of a proximity object and images of a non-proximity object are outputted to the display, the difference between the display positions of the images of the proximity object is set to be smaller than the difference between the display positions of the images of the non-proximity object.

If a proximity object is displayed in a simplified manner and so as to decrease the difference between the display positions on the display of an image for a right eye and an image for a left eye of the proximity object, it becomes possible to generate images easily viewable. In addition, since a proximity object is displayed as a simplified image as described above, the processing of decreasing the difference between the display positions is relatively inconspicuous, and thus unnaturalness due to the processing is reduced.

In addition, in order to reduce the difference between the display positions, the display controller may generate, by using two virtual cameras having a first interval therebetween, the image for a right eye and the image for a left eye of the non-proximity object, and generate, by using two virtual cameras having a second interval smaller than the first interval therebetween, the image for a right eye and the image for a left eye of the proximity object.

In this case, typically, the position of the representative point of the "two virtual cameras having the second interval therebetween" (for example, the middle point therebetween or the position of one of the two virtual cameras) is set to be the same as the representative point of the "two virtual cameras having the first interval therebetween". In addition, typically, the shooting direction of the "two virtual cameras having the second interval therebetween" is set to be the same as the shooting direction of the "two virtual cameras having the first interval therebetween". The parallax between an image for a right eye and an image for a left eye of a virtual object shot with the "two virtual cameras having the second interval therebetween" is smaller than the parallax between an image for a right eye and an image for a left eye of the virtual object shot with the "two virtual cameras having the first interval therebetween", even if the virtual object is present at the same position. The positions of the virtual cameras for shooting a proximity object may be separated in the direction opposite to the shooting direction from the positions of the virtual cameras for shooting a non-proximity object. In the case where the shooting directions of the two virtual cameras cross, the angle between the shooting directions of the virtual cameras for shooting a proximity object may be set to be larger than the angle between the shooting directions of the virtual cameras for shooting a non-proximity object.

Alternatively, a non-proximity object may be drawn with two virtual cameras having a predetermined interval therebetween, thereby generating an image for a right eye and an image for a left eye of the non-proximity object. Then, a proximity object may be drawn with a single camera placed at the representative point of the two virtual cameras (for example, the middle point), and the resultant image may be superimposed onto each of the image for a right eye and an image for the left eye of the non-proximity object. In this way, the parallax of the proximity object on the display surface can be made zero.

When the predetermined virtual object (for example, a player object) is present at less than the predetermined distance from the predetermined viewpoint, the display controller may display the predetermined virtual object in the simplified manner, and even when a virtual object (for example, a non-player object, a construction object, or a geography object) other than the predetermined virtual object is present at less than the predetermined distance from the predetermined viewpoint, the display controller may not display the virtual object in the simplified manner.

In this way, virtual objects are not simplified more than necessary. Therefore, the situation around the viewpoint can be easily grasped.

When the predetermined virtual object is present at less than the predetermined distance from the predetermined viewpoint, the display controller may perform processing for decreasing the difference between the display positions of the predetermined virtual object, and even when a virtual object other than the predetermined virtual object is present at less than the predetermined distance from the predetermined viewpoint, the display controller may not perform processing for decreasing the difference between the display positions of the predetermined virtual object.

In this way, a virtual object other than the predetermined virtual object can be displayed so as to have a correct parallax even if the virtual object is present near the viewpoint. Therefore, the virtual space can be displayed in a relatively natural fashion.

When the predetermined virtual object is present at less than the predetermined distance from the predetermined viewpoint, the display controller may generate, by using two virtual cameras having the first interval therebetween, an image for a right eye and an image for a left eye of a "virtual object other than the predetermined virtual object", and may superimpose respective images of the predetermined virtual object that are generated by two virtual cameras having the second distance therebetween, onto the image for a right eye and the image for a left eye, by using respective pieces of depth information about the image for a right eye and the image for a left eye, generated by the generation of the image for a right eye and the image for a left eye.

In this way, in the case where a "predetermined virtual object" and an "object other than the predetermined virtual object" are present near the viewpoint, it is possible to decrease the difference between the display positions of the "predetermined virtual object", by using correct display priorities based on the depth positions.

The display controller may generate the image for a right eye and the image for a left eye of the proximity object as semi-transparent images.

In this way, it is possible to generate images easily viewable. Specifically, in the case where the difference between the display positions of a proximity object is decreased, it is possible to reduce unnaturalness due to the decreasing processing.

A player object that is operated by a player may be present in the predetermined virtual space. In this case, the display controller may set a viewpoint and a direction of line of vision, based on the position of the player object, thereby generating an image including the player object, and the "predetermined virtual object" may be the player object.

In this way, even if an object always displayed on the screen is temporarily displayed in a simplified manner as necessary, there is relatively no trouble. A player needs to grasp objects other than the above object are. Therefore, if the other objects are not displayed in a simplified manner even when they are near the viewpoint, the player can easily play a game.

The second aspect of the exemplary embodiments is to provide a display control system comprising display controller configured to, based on a predetermined viewpoint, generate an image for a right eye and an image for a left eye with respect to a predetermined virtual space in which a predetermined virtual object is present, and output the image for a right eye and the image for a left eye to a predetermined display in a stereoscopically visible manner. The display controller generates an image for a right eye and an image for a left eye of a proximity object which is a virtual object present at less than a predetermined distance from the predetermined viewpoint, such that the proximity object is displayed in a simplified manner.

The third aspect of the exemplary embodiments is to provide a display control apparatus comprising display controller configured to, based on a predetermined viewpoint, generate an image for a right eye and an image for a left eye with respect to a predetermined virtual space in which a predetermined virtual object is present, and output the image for a right eye and the image for a left eye to a predetermined display in a stereoscopically visible manner. The display controller generates an image for a right eye and an image for a left eye of a proximity object which is a virtual object present at less than a predetermined distance from the predetermined viewpoint, such that the proximity object is displayed in a simplified manner.

The fourth aspect of the exemplary embodiments is to provide a display control method for controlling a display control apparatus or a display control system. In the display control method, when an image for a right eye and an image for a left eye with respect to a predetermined virtual space in which a predetermined virtual object is present are generated based on a predetermined viewpoint, and the image for a right eye and the image for a left eye are outputted to a predetermined display in a stereoscopically visible manner, an image for a right eye and an image for a left eye of a proximity object which is a virtual object present at less than a predetermined distance from the predetermined viewpoint are generated such that the proximity object is displayed in a simplified manner.

According to the exemplary embodiments, it is possible to generate stereoscopic images easily viewable.

These and other objects, features, aspects and advantages of exemplary embodiments will become more apparent from the following detailed description of exemplary embodiments when taken in conjunction with the accompanying drawings.

BRIEF DESCRIPTION OF THE DRAWINGS

FIG. 2 is a block diagram of the display control apparatus;

FIG. 4 shows an example of a screen (displayed in a simplified manner);

DESCRIPTION OF THE PREFERRED EMBODIMENTS

[Configuration of Game Apparatus]

Figure 1:
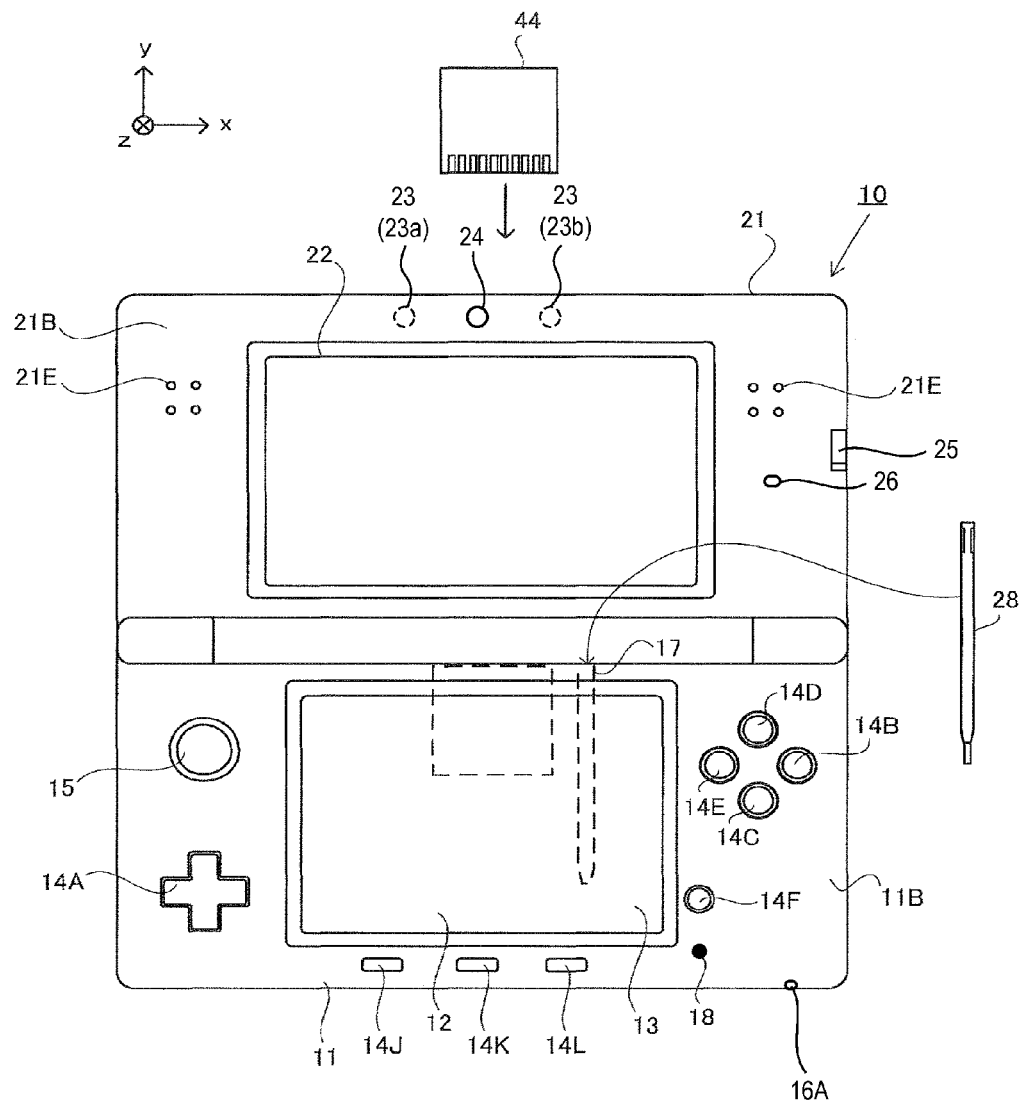
FIG. 1 is a view showing an outer appearance of a display control apparatus.

Hereinafter, with reference to the drawings, a game program and a game apparatus of one embodiment of display control programs and display control apparatuses according to the non-limiting example embodiments will be described. FIG. 1 is a plan view showing the outer appearance of a game apparatus 10. The game apparatus 10 is a hand-held game apparatus.

First, with reference to FIG. 1, an external structure of the game apparatus 10 will be described. The game apparatus 10 includes a lower housing 11 and an upper housing 21 as shown in FIG. 1 and FIG. 2A to FIG. 2D. The lower housing 11 and the upper housing 21 are connected to each other so as to be openable and closable (i.e., foldable). In the present embodiment, the lower housing 11 and the upper housing 21 are each formed in a horizontally long plate-like rectangular shape, and are connected to each other at long side portions thereof so as to be pivotable with respect to each other.

(Description of Lower Housing)

Initially, a structure of the lower housing 11 will be described. As shown in FIG. 1, in the lower housing 11, a lower LCD (Liquid Crystal Display) 12, a touch panel 13, operation buttons 14A to 14L (FIG. 1, FIG. 3), an analog stick 15, an LED 16A and an LED 16B, (not shown) an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11 with respect to the longitudinal direction (x-axis direction in FIG. 1). The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (width× height). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, besides the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The buttons 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided on the inner side surface of the lower housing 11. As shown in FIG. 1, the analog stick 15 is provided above the cross button 14A. A stick portion of the analog stick 15, which is operated with a finger, can be inclined in any direction (at any angle corresponding to up, down, right, left, or diagonal direction) on the inner side surface of the lower housing 11. The analog stick 15 has a keytop which is configured to slide parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object moves in a direction in which the analog stick 15 is inclined. It should be noted that any component that enables an analog input by being slid by a predetermined amount in any direction among up, down, left, right, and diagonal directions may be used as the analog stick 15.

A connector (not shown) for electrically connecting the game apparatus 10 and the external memory 44 having a game program stored therein in a detachable manner is provided at the upper side surface of the lower housing 11. A predetermined game program is executed when the external memory 44 is connected to the game apparatus 10. It is noted that the connector and a cover section 11D thereof may be provided at another side surface of the lower housing 11 (for example, right side surface).

Further, the microphone hole 18 is provided on the inner side surface of the lower housing 11. Under the microphone hole 18, a microphone is provided as a sound input device described below, and the microphone detects for a sound from the outside of the game apparatus 10.

A rechargeable battery (not shown) which is the power source for the game apparatus 10 is accommodated in the lower housing 11, and the battery can be charged through a terminal provided at a side surface (for example, the upper side surface) of the lower housing 11.

(Description of Upper Housing)

Next, a structure of the upper housing 21 will be described. As shown in FIG. 1, in the upper housing 21, an upper LCD (Liquid Crystal Display) 22, outer cameras 23 (a camera 23a for a left eye and a camera 23b for a right eye), an inner camera 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21 with respect to the longitudinal direction (x-axis direction in FIG. 1). The area of a screen of the upper LCD 22 is set so as to be greater than the area of the screen of the lower LCD 12. Specifically, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening of the upper housing 21. Although, in the present embodiment, the upper LCD 22 is an LCD, a display device using an EL (Electro Luminescence), or the like may be used. In addition, a display device having any resolution may be used as the upper LCD 22. Alternatively, the upper LCD 22 may be a stereoscopic display that is viewed by a user with stereoscopic glasses (any type may be used, for example, polarization type or shutter type may be used), or may be a so-called head mounted display.

The upper LCD 22 is a display device capable of displaying a stereoscopically visible image. In the present embodiment, an image for left eye and an image for right eye are displayed by using substantially the same display area. Specifically, the upper LCD 22 may be a display device using a method in which the image for left eye and the image for right eye are alternately displayed in the horizontal direction in predetermined units (for example, every other line). Alternatively, the upper LCD 22 may be a display device using a method in which the image for left eye and the image for right eye are alternately displayed by time division. In the present embodiment, the upper LCD 22 is a display device capable of displaying an image which is stereoscopically visible with naked eyes. A lenticular lens type display device or a parallax barrier type display device is used for enabling the image for left eye and the image for right eye, which are alternately displayed in the horizontal direction, to be separately viewed by the left eye and the right eye, respectively. In the present embodiment, the upper LCD 22 of a parallax barrier type is used. The upper LCD 22 displays, by using the image for right eye and the image for left eye, an image (a stereoscopic image) which is stereoscopically visible with naked eyes. That is, the upper LCD 22 allows a user to view, by means of a parallax barrier, the image for left eye with the user's left eye and the image for right eye with the user's right eye. In this manner, a stereoscopic image (a stereoscopically visible image) exerting a stereoscopic effect for the user can be displayed. Further, the upper LCD 22 may disable the parallax barrier. When the parallax barrier is disabled, an image can be displayed in a planar manner (i.e., it is possible to display an image not in the above-described stereoscopically visible manner but in a planarly visible manner). Thus, the upper LCD 22 is a display device capable of switching between a stereoscopic display mode for displaying a stereoscopically visible image and a planar display mode for displaying an image in a planar manner (i.e., for displaying a planarly visible image). The switching of the display mode is performed by a predetermined hardware switch, which will be described below.

Further, speaker holes 21E are formed in the inner side surface of the upper housing 21. A sound from a below-described speaker 43 is outputted through the speaker holes 21 E.

(Internal Configuration of Game Apparatus 10)

Next, an internal electrical configuration of the game apparatus 10 will be described with reference to FIG. 2. FIG. 2 is a block diagram showing an internal configuration of the game apparatus 10. As shown in FIG. 2, the game apparatus 10 includes, in addition to the components described above, electronic components such as an information processing section 31, a main memory 32, an external memory interface (external memory I/F) 33, an internal data storage memory 35, a power supply circuit 40, an interface circuit (I/F circuit) 41, and the like. These electronic components are mounted on an electronic circuit board, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a program for executing predetermined processing is stored in a memory (for example, the external memory 44 connected to the external memory I/F 33 or the internal data storage memory 35) inside the game apparatus 10. The CPU 311 of the information processing section 31 executes the above program to perform processing associated with the program (for example, imaging processing, or image display processing described later). The program executed by the CPU 311 of the information processing section 31 may be obtained from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

The main memory 32, the external memory I/F 33, and the internal data storage memory 35 are connected to the information processing section 31. The external memory I/F 33 is an interface for detachably connecting to the external memory 44.

The main memory 32 is volatile storage means used as a work area and a buffer area for (the CPU 311 of) the information processing section 31. That is, the main memory 32 temporarily stores various types of data used for the aforementioned processing based on a program, and temporarily stores a program obtained from the outside (i.e., from the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is structured as, for example, a read-only semiconductor memory. When the external memory 44 is connected to the external memory I/F 33, the information processing section 31 can load a program stored in the external memory 44. Predetermined processing is performed when the program loaded by the information processing section 31 is executed.

The internal data storage memory 35 is structured as a non-volatile readable and writable memory (for example, a NAND flash memory), and is used for storing predetermined data. For example, data and/or programs downloaded by communication means not shown are stored in the internal data storage memory 35.

The power supply circuit 40 controls power from the power source (i.e., the rechargeable battery accommodated in the lower housing 11 as described above) of the game apparatus 10, and supplies the power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice uttered by a user, and outputs a sound signal to the I/F circuit 41, accordingly. The amplifier amplifies a sound signal from the I/F circuit 41, and a resultant sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. For example, the sound control circuit performs A/D conversion and D/A conversion on sound signals, and also converts sound signals into a predetermined form of sound data. The touch panel control circuit generates a predetermined form of touch position data based on a signal outputted from the touch panel 13, and outputs the touch position data to the information processing section 31. The touch position data indicates coordinates of a position, on an input surface of the touch panel 13, at which an input has been performed. The touch panel control circuit reads a signal outputted from the touch panel 13 and generates touch position data once in every predetermined period. The information processing section 31 obtains the touch position data to recognize a position, on the touch panel 13, at which an input has been performed.

Operation buttons 14 include the above-described operation buttons 14A to 14L, and are connected to the information processing section 31. The operation buttons 14 output, to the information processing section 31, operation data indicating input states of the respective operation buttons 14A to 141 (i.e., indicating whether the operation buttons 14A to 141 have been pressed). The information processing section 31 obtains the operation data from the operation buttons 14 to perform processing in accordance with the inputs performed via the operation buttons 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopic image (i.e., a stereoscopically visible image) using an image for a right eye and an image for a left eye.

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for right eye and an image for left eye, which are stored in the VRAM 313 of the information processing section 31, are outputted to the upper LCD 22. More specifically, the LCD controller alternately repeats reading of pixel data of the image for right eye for one line in the vertical direction, and reading of pixel data of the image for left eye for one line in the vertical direction, thereby reading, from the VRAM 313, the image for right eye and the image for left eye.

Thus, an image to be displayed is divided into images for right eye and images for left eye, each of which is a rectangle-shaped image having one line of pixels aligned in the vertical direction. Then, an image, in which the rectangle-shaped images for right eye that are obtained through the division and the rectangle-shaped images for left eye that are obtained through the division are alternately arranged, is displayed on the screen of the upper LCD 22. A user views the image through the parallax barrier in the upper LCD 22, so that the images for right eye are viewed by the user's right eye and the images for left eye are viewed by the user's left eye. In this manner, a stereoscopically visible image is displayed on the screen of the upper LCD 22.

[Outlines of Stereoscopic Image Display Processing by Game Apparatus 10]

Hereinafter, the outlines of display control processing executed by the game apparatus 10 will be described.

Figure 3:
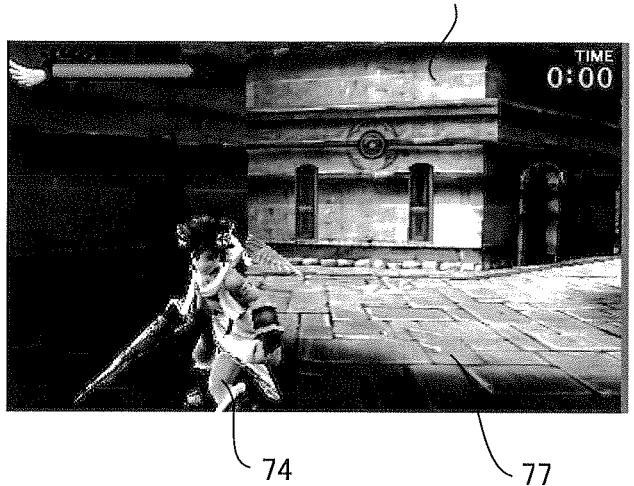
FIG. 3 shows an example of a screen (in normal state)
Figure 3:
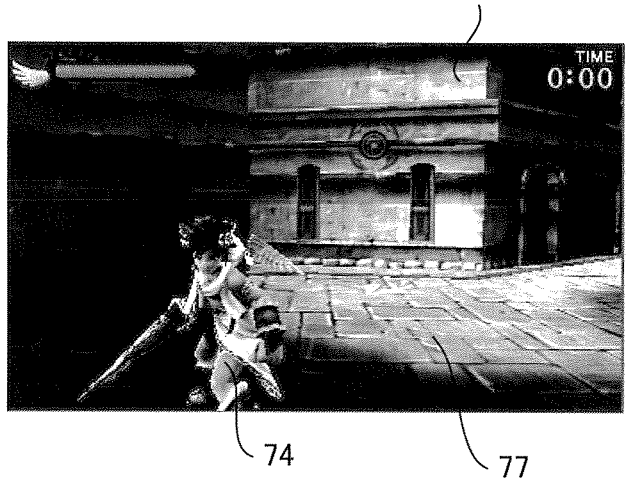

FIG. 3 and FIG. 4 are examples of game images of the game apparatus 10 according to the present embodiment. FIG. 3 is an example of a game image in a standard state. A character 74 is a player object that can be operated by a player with the operation button 14 or the analog stick 15. In a game executed by the game apparatus 10 in the present embodiment, when a player object is present within a predetermined distance from a virtual camera, the player object is displayed as a semi-transparent silhouette image. In the case shown in FIG. 3, since the player object is present the predetermined distance or farther from the virtual camera, the player object is drawn as a detailed image in which many colors are used and every portion is specifically represented. Objects other than the player object (which are, for example, a construction object 76, a floor object 77, an enemy object not shown, and the like, and hereinafter referred to as other objects) are drawn as detailed images. FIG. 3(*a*) shows an image for a left eye, and FIG. 3(*b*) shows an image for a right eye. FIG. 4 is an example of a game image in the case where the player object 74 is present within a predetermined distance from the virtual camera. In this case, the player object 74 is displayed as a silhouette image. Specifically, the entirety of the player object 74 is displayed as an image with a single color. More specifically, the player object 74 is drawn such that each of the hue, the brightness, and the colorfulness is identical in the entirety of the player object 74. That is, since the entirety of the player object 74 is drawn with an identical color, the portions of the player object 74 cannot be discriminated from each other, and only the contour of the entirety of the player object 74 can be recognized. In addition, other objects are drawn as detailed images, as in the case shown in FIG. 3. That is, other objects are not displayed as silhouette images even when they are close to the virtual camera. On the other hand, the player object 74 is drawn in a semi-transparent manner as well as being displayed as a silhouette image.

Figure 5:
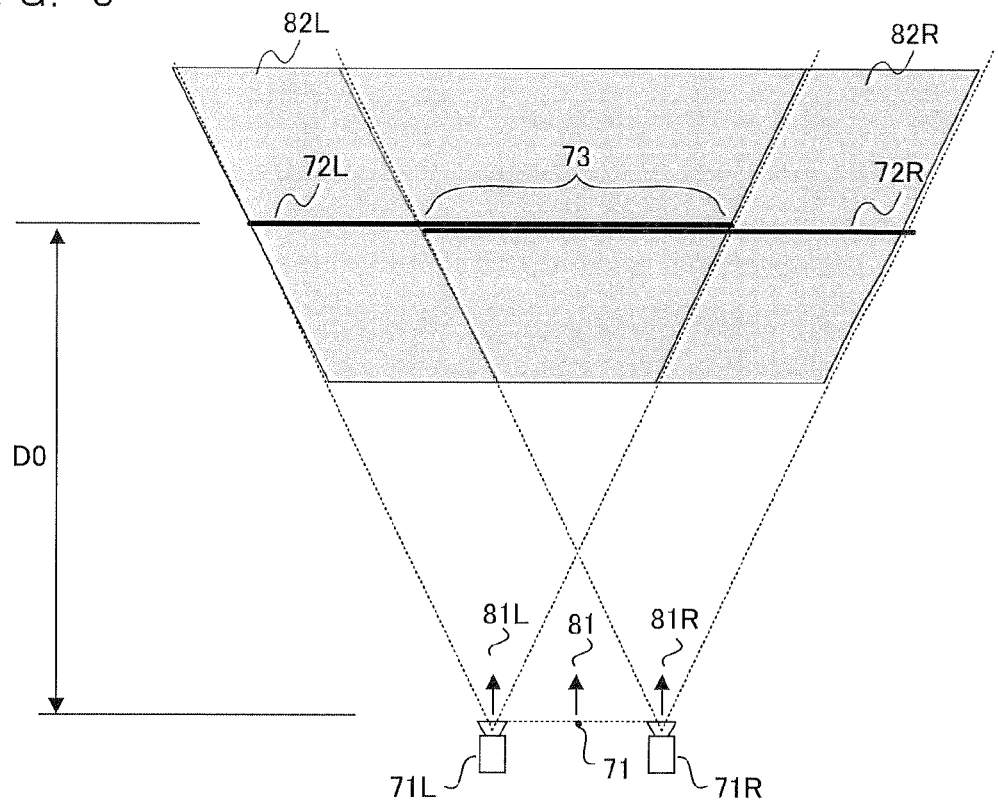
FIG. 5 shows processing for generating stereoscopic images with virtual cameras.

FIG. 5 is a diagram for illustrating processing for generating an image for a left eye and an image for a right eye for providing a stereoscopic view. In the processing of the present embodiment, first, a representative point 71 and a shooting direction 81 of virtual cameras are set. A left virtual camera 71L for generating an image for a left eye is placed at a position separated leftward in the direction perpendicular to the shooting direction (that is, for example, in the negative direction on the X-axis of a camera coordinate system) from the representative point 71 by a predetermined distance, and a shooting direction 81L of the left virtual camera 71L is set at the same direction of the shooting direction 81. In addition, a right virtual camera 71R for generating an image for a right eye is placed at a position separated rightward in the direction perpendicular to the shooting direction (that is, for example, in the positive direction on the X-axis of the camera coordinate system) from the representative point 71 by a predetermined distance, and a shooting direction 81R of the right virtual camera 71R is set at the same direction of the shooting direction 81.

D0 shown in FIG. 5 is a value for representing, by a distance in the shooting direction from the virtual cameras, the position in a virtual space at which the difference between the display position of an image for a right eye and the display position of an image for a left eye on the upper LCD 22 is zero. An object present at this position appears to be present on the display surface of the upper LCD 22. That is, an object present at this position does not appear to protrude from the display surface, and does not appear to be retracted backward from the display surface. As used herein, the distance D0 is referred to as a stereoscopic view reference distance. The left virtual camera 71L projects and renders a range indicated by a view volume 82L, and the right virtual camera 71R projects and renders a range indicated by a view volume 82R. Regarding a projection plane at the stereoscopic view reference distance D0, a portion, in a range 73, of an image 72L rendered by the left virtual camera 71L is extracted and displayed on the upper LCD 22, and a portion, in the range 73, of an image 72R rendered by the right virtual camera 71R is extracted and displayed on the upper LCD 22. It is noted that, actually, the extraction from the rendered images is performed by using the ratio between 72L and 73 and the ratio between 72R and 73. The obtained images are displayed, being superimposed onto each other, on the upper LCD 22. Therefore, an object present at a position separated from the virtual cameras by the stereoscopic view reference distance D0 is displayed such that there is no difference between their display positions on the upper LCD 22.

Figure 6:
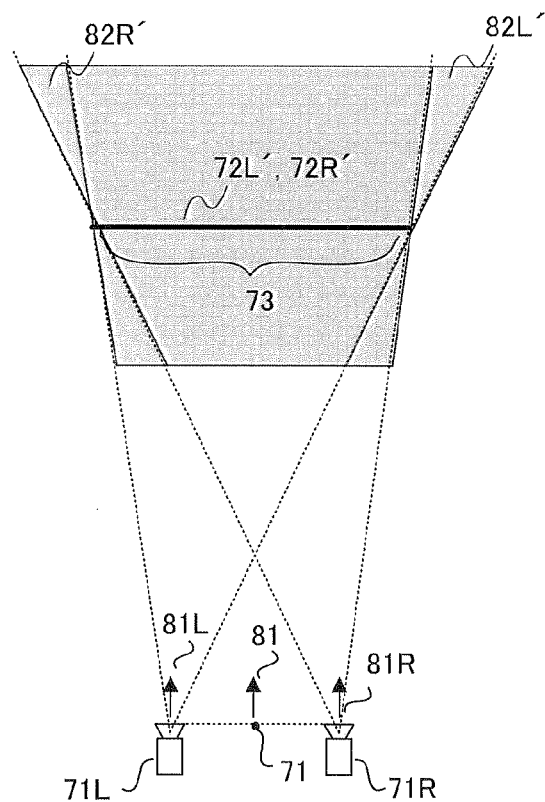
FIG. 6 shows a variation of the processing for generating stereoscopic images with virtual cameras.

FIG. 6 shows an exemplary variation of the processing for generating an image for a left eye and an image for a right eye for providing a stereoscopic view. In the example shown in FIG. 5, a portion, in the range 73, of an image rendered by the left virtual camera 71L is extracted and displayed, and a portion, in the range 73, of an image rendered by the right virtual camera 71R is extracted and displayed. On the other hand, in the example shown in FIG. 6, view volumes 82L' and 82R' are set such that images rendered by the left virtual camera 71L and the right virtual camera 71R coincide with the range 73. As a result, it is unnecessary to perform the processing of extracting the display ranges after the rendering.

Figure 7:
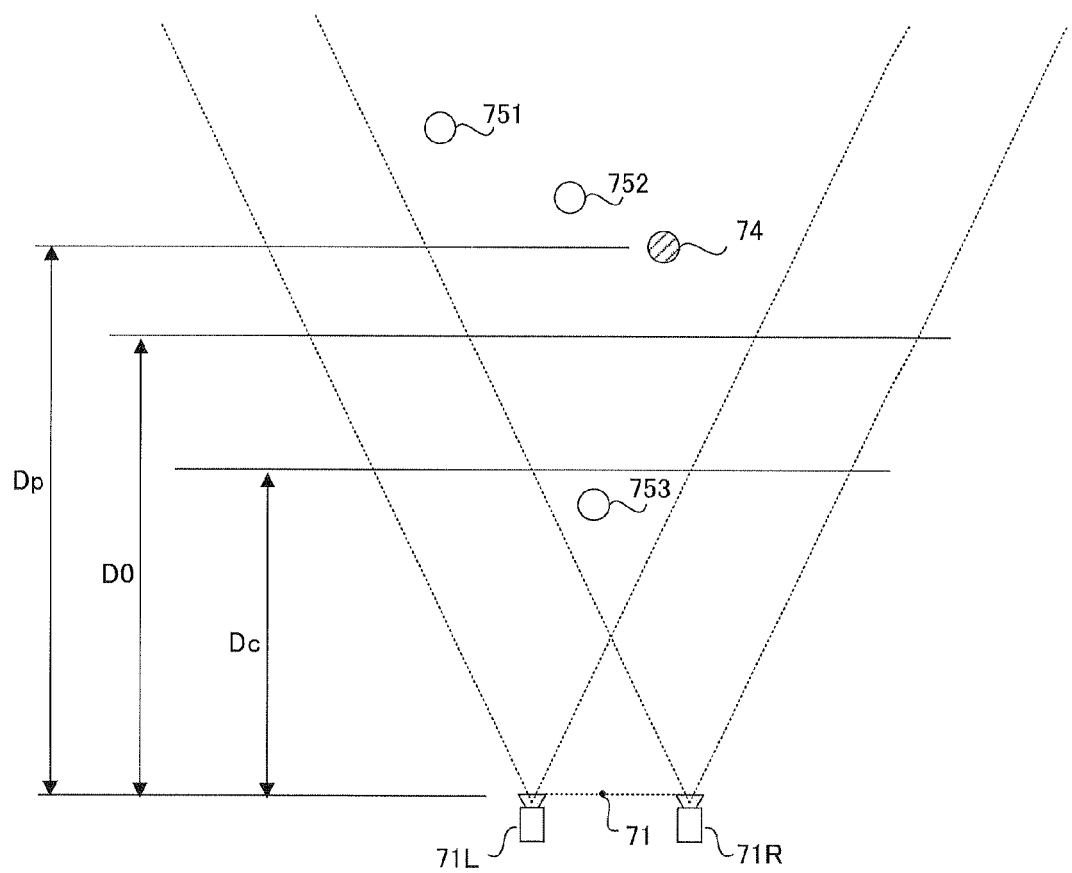
FIG. 7 shows the placement of virtual cameras 71L and 71R, a player object 74, and the like in a standard state.

FIG. 7 is a diagram showing the placement of the representative point 71 of the virtual cameras, the left virtual camera 71L, the right virtual camera 71R, the player object 74, and the enemy objects 751 to 753 in the standard state during the game. The representative point 71 of the virtual cameras is changed in accordance with the position of the player object 74. Specifically, in the standard state, the representative point 71 of the virtual cameras is placed at a position separated from the player object 74 by a predetermined distance Dp, and the shooting direction is set such that the player object 74 is included in the field of view. It is noted that, when the player object 74 is not accelerating, the virtual cameras shoot toward the player object 74, and therefore, the predetermined distance Dp coincides with the distance, in the shooting direction, between the player object 74 and the virtual cameras. The value of the predetermined distance Dp as it is in the standard state is denoted as Dp0. It is noted that the standard state is a state in which the player object 74 is not accelerating. If the player object 74 accelerates in the direction in which the player object 74 gets away from the virtual cameras, Dp becomes larger than the standard value Dp0. On the other hand, if the player object 74 accelerates toward the representative point 71 of the virtual cameras, Dp becomes smaller than the standard value Dp0. In addition, also in the case where the player object 74 accelerates in the direction perpendicular to the shooting direction of the virtual cameras, Dp becomes larger than the standard value Dp0. In this way, since the value of Dp changes depending on the situation, the player object 74 is displayed while moving upward, downward, rightward, or leftward on the upper LCD 22.

D0 shown in FIG. 7, which is the same as that shown in FIG. 5, is a value that defines, by a distance from the virtual cameras, the position at which the difference between the display position of an image for a right eye and the display position of an image for a left eye on the display of the upper LCD 22 (hereinafter, may be simply referred to as display) is zero. That is, an object present at less than the distance D0 from the virtual cameras appears to protrude from the display surface, an object present at the distance D0 from the virtual cameras appears to be on the display surface, and an object present at more than the distance D0 from the virtual cameras appears to be retracted backward from the display surface. Dp0 described above is set to be larger than D0. As a result, in the standard state, the player object 74 is displayed being retracted backward from the display surface. Although the player object 74 is always displayed so as to be included in the range of field of view of the virtual cameras, the visibility is high because the player object 74 is displayed being retracted backward from the display surface. In the standard state, a game image as shown in FIG. 3 is displayed. That is, in the standard state (the state in which Dp is larger than D0), the player object 74 is drawn as a detailed image with many colors such that the portions of the player object 74 can be discriminated from each other. It is noted that the enemy objects 751 to 753 are drawn as detailed images. It is noted that although the enemy object 753 is present at less than the predetermined distance D0 from the virtual cameras, the enemy object 753 is drawn as a detailed image, similarly to the enemy objects 751 and 752.

In the present embodiment, Dc shown in FIG. 7 is a value for determining whether or not to display the player object 74 as a silhouette image, which is defined by a distance in the shooting direction from the virtual cameras. Hereinafter, this value is referred to as a determination reference value. Specifically, if the distance, in the shooting direction, between the player object 74 and the virtual cameras is smaller than Dc (or is equal to or smaller than Dc), the player object 74 is drawn as a silhouette image. If the distance, in the shooting direction, between the player object 74 and the virtual cameras is equal to or larger than Dc (or is larger than Dc), the player object 74 is drawn as a detailed image with many colors such that the portions of the player object 74 can be discriminated from each other. In the present embodiment, the determination reference value Dc is set to be smaller than D0. However, Dc may be set to be equal to D0, or may be set to be larger than D0. In the case where Dc is set to be equal to D0, the player object 74 is changed to a silhouette image when the player object 74 becomes closer to the virtual cameras than in the state in which the player object 74 appears to be on the display surface. In the case where Dc is set to be larger than D0, it is ensured that, when the player object 74 is drawn as a detailed image, the player object 74 always appears to be retracted backward from the display surface. It is noted that even in the case where Dc is set to be larger than D0, Dc is set to be smaller than Dp0. If Dc is set to be smaller than Dp0, the player object 74 is drawn as a detailed image in the standard state.

Figure 8:
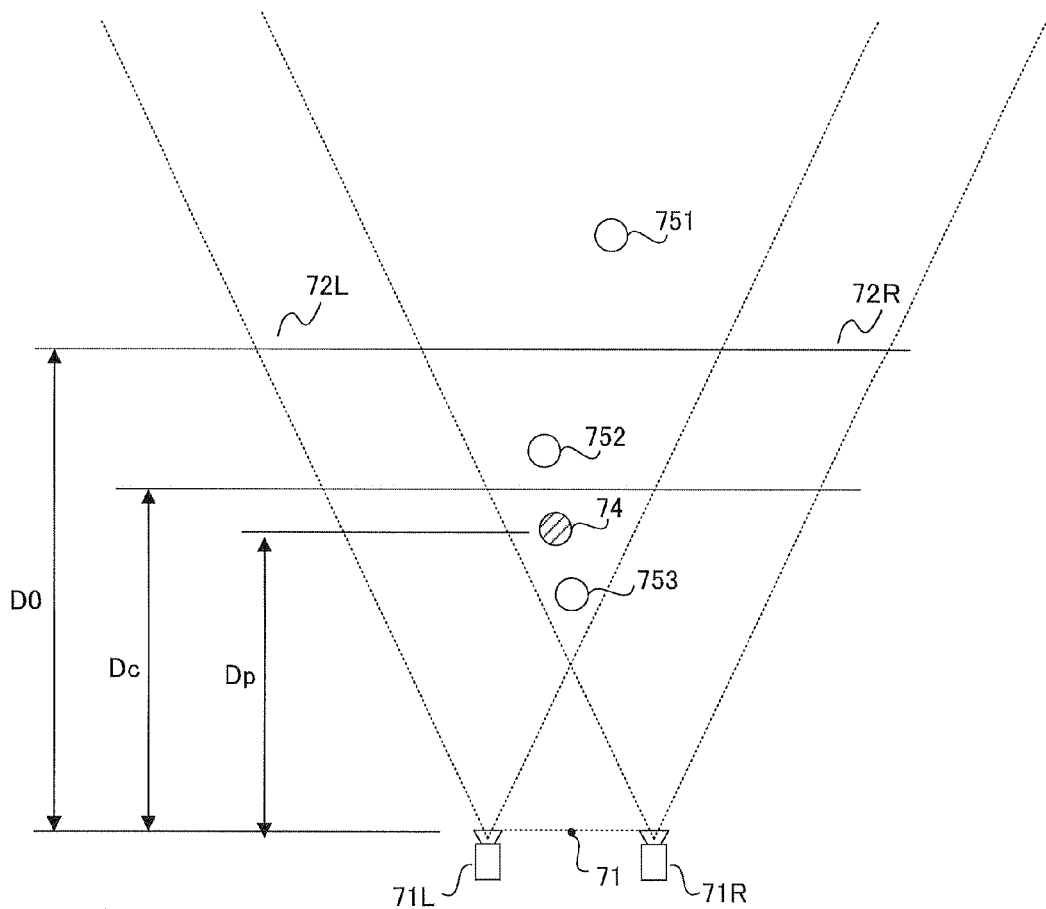
FIG. 8 shows the placement as it is when the player object is close to the virtual cameras.

FIG. 8 is a diagram showing the placement of the representative point 71 of the virtual cameras, the left virtual camera 71L, the right virtual camera 71R, the player object 74, and the enemy objects 751 to 753 in the case where the distance, in the shooting direction, between the player object 74 and the virtual cameras is smaller than Dc. As previously described, such a situation occurs, for example, when the player object 74 is accelerating toward the virtual cameras. At this time, a game image as shown in FIG. 4 is displayed. That is, the player object 74 is displayed as a silhouette image. It is noted that similarly to the situation in FIG. 7, the enemy objects 751 to 753 are displayed as detailed images. In FIG. 8, the enemy objects 752 and 753 are present at positions where they overlap with the player object 74 on the display. The enemy object 753 is closer to the virtual cameras than the player object 74, and the enemy object 754 is farther from the virtual cameras than the player object 74. Therefore, on the display, a detailed image of the enemy object 753 is drawn in front, a silhouette image of the player object 74 is drawn in back of the image of the enemy object 753, and a detailed image of the enemy object 752 is drawn in back of the image of the player object 74.

[Details of Processing by Game Apparatus 10]

Figure 9:
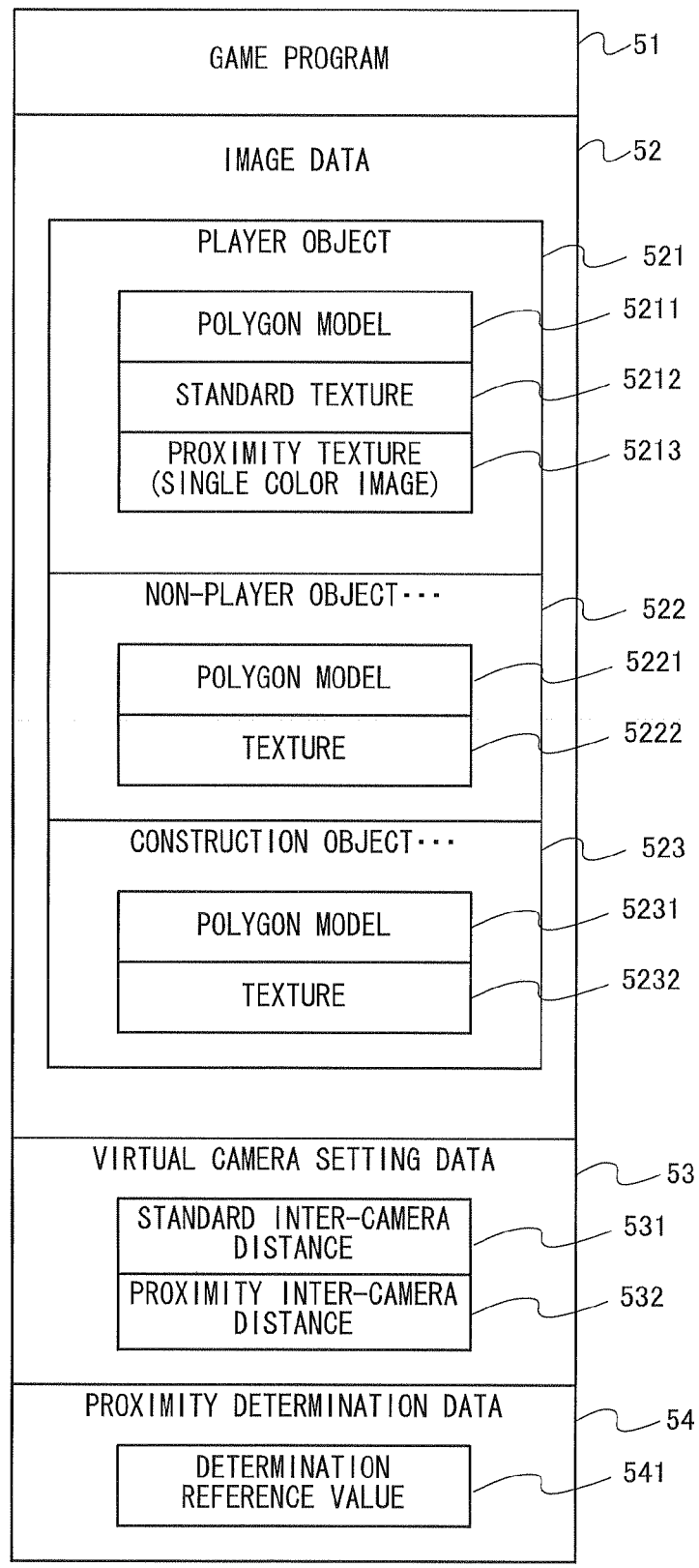
FIG. 9 shows various types of data (ROM data) used in processing based on a display control program.

Next, with reference to FIG. 9 to FIG. 12, the details of game processing executed by a game program will be described. First, various types of data used in game processing will be described. FIG. 9 is a diagram showing fixed value data included in the game program, of the various types of data used in the processing by the game program. The fixed value data is included in the game program stored in the external memory 44 or the data storage internal memory 35, and is loaded onto the main memory 32 when the game program is executed.

A game program 51 is a program for causing the information processing section 31 of the game apparatus 10 to execute processing described later with reference to FIG. 11 and FIG. 12. The game program 51 includes a program for progressing a predetermined game and a program for executing display control processing.

Image data 52 is data for generating images of objects (player objects, non-player objects such as enemy objects, construction objects, geography objects, and the like). The image data 52 includes data of polygon models, and texture data. Image data 521 of player object includes a polygon model 5211, a standard texture 5212, and a proximity texture 5213. The polygon model 5211 is data defining the shape of the player object 74, that is, defining the shapes of the respective portions of the player object 74 such as a head, a trunk, an arm, a hand, and a leg. The standard texture 5212 is used when the player object 74 is present at more than a predetermined distance (determination reference value Dc) from the virtual cameras, and includes textures of images, with many colors, that are specific to the respective portions. The proximity texture 5213 is used when the player object 74 is present at less than the predetermined distance (determination reference value Dc) from the virtual cameras, and includes image data with a single color. More specifically, an identical hue, an identical brightness, and an identical colorfulness are set in the entirety of each image. In addition, a common color is set for textures of all the portions of the player object. Image data 522 of non-player objects and image data 523 of construction objects include pieces of image data whose number is equal to the number of types of non-player objects and construction objects, and each piece of image data includes a polygon model and a texture.

As previously described, in the present embodiment, the position of the left virtual camera and the position of the right virtual camera are calculated from the position of the representative point of the virtual cameras. Virtual camera setting data 53 is used for this calculation. Specifically, if the player object 74 is present at more than the predetermined distance (determination reference value Dc) from the virtual cameras, the left virtual camera and the right virtual camera are placed at positions each oppositely separated in the direction perpendicular to the shooting direction by the half of a standard inter-camera distance 531 from the position of the representative point of the virtual cameras. All of the player object, non-player objects, construction objects, and geography objects are shot with the virtual cameras placed as described above, and are rendered.

On the other hand, if the player object 74 is present at less than the predetermined distance (determination reference value Dc) from the virtual cameras, the left virtual camera and the right virtual camera are placed at positions each oppositely separated in the direction perpendicular to the shooting direction by the half of the standard inter-camera distance 531 from the position of the representative point of the virtual cameras. Objects other than the player object (non-player objects, construction objects, geography objects, and the like) are shot with the virtual cameras placed as described above, and are rendered. In addition, the left virtual camera and the right virtual camera are placed at positions each oppositely separated in the direction perpendicular to the shooting direction by the half of a proximity inter-camera distance 532 from the position of the representative point of the virtual cameras. The player object are shot with the virtual cameras placed as described above, and are rendered.

It is noted that the proximity inter-camera distance 532 is set at a smaller value than the standard inter-camera distance 531. In the present embodiment, the proximity inter-camera distance 532 is 0.2 multiple of the standard inter-camera distance 531. It is noted that although the proximity inter-camera distance 532 is equal to or larger than 0 multiple of the standard inter-camera distance 531 and is smaller than a 1 multiple of the standard inter-camera distance 531, alternatively, the proximity inter-camera distance 532 may be equal to or smaller than 0.5 multiple of the standard inter-camera distance 531. As described above, since the proximity inter-camera distance 532 is smaller than the standard inter-camera distance 531, when the player object 74 is present at less than the predetermined distance (determination reference value Dc) from the virtual cameras, the player object 74 is displayed such that the parallax is small on the display.

Proximity determination data 54 includes data 541 indicating the determination reference value Dc described above.

Figure 10:
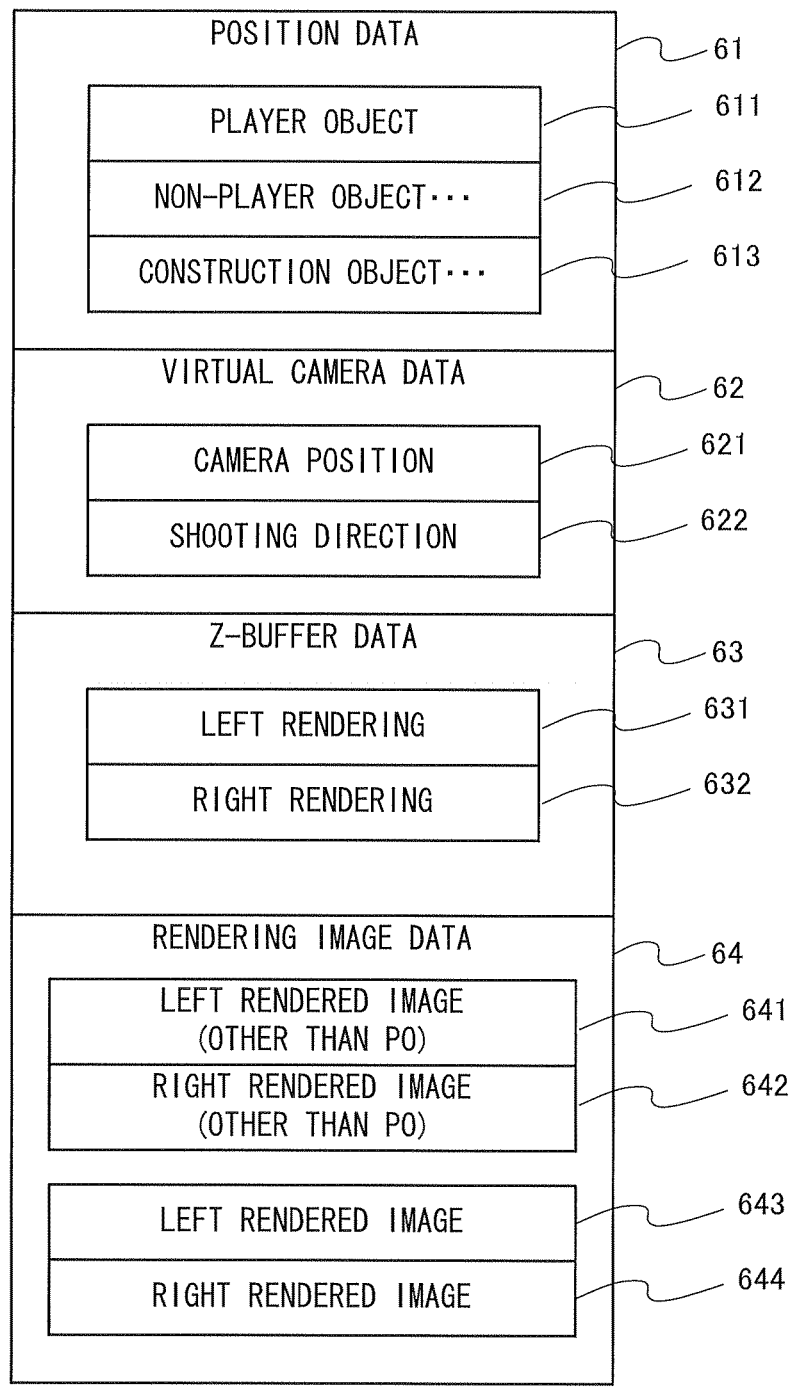
FIG. 10 shows various types of data (temporarily generated in the execution of the program) used in the processing based on the display control program.

FIG. 10 is a diagram showing data temporarily generated in the main memory 32 by execution of the game program shown in FIG. 9.

Position data 61 indicates the position of each object in the virtual space. It is noted that in the present embodiment, the virtual space is a 3-dimensional virtual space. The position data 61 includes position data 611 of player object, position data 612 of non-player objects, and position data 613 of construction objects. Each of the position data 612 of non-player objects and the position data 613 of construction objects includes pieces of position data whose number is equal to the number of the objects.

Virtual camera data 62 includes a camera position 621 that is position data of the virtual cameras in the virtual space, and shooting direction data 622.

Z-buffer data 63 is data obtained by storing Z-buffer data generated when objects other than the player object 74 are rendered in the case where the player object 74 is present at less than the predetermined distance (determination reference value Dc) from the virtual cameras. After the objects other than the player object are rendered, the player object is rendered. At this time, by referring to the Z-buffer data, depth positions of the player object and the other object relative to the virtual cameras are determined, and their priorities of drawing are determined. The Z-buffer data 63 includes "Z-buffer data (left rendering) 631" that is Z-buffer data generated when the objects other than the player object are rendered with the left virtual camera, and "Z-buffer data (right rendering) 632" that is Z-buffer data generated when the objects other than the player object are rendered with the right virtual camera.

Rendered image data 64 includes: a "left rendered image (other than PO) 641" and a "right rendered image (other than PO) 642" that are obtained by rendering objects other than the player object 74 in the case where the player object 74 is present at less than the predetermined distance (determination reference value Dc) from the virtual cameras; and a left rendered image 643 and a right rendered image 644 that are final rendering results. The final rendering result is a rendered image outputted to the upper LCD 22. In the case where the player object 74 is present at less than the predetermined distance (determination reference value Dc) from the virtual cameras, images obtained by rendering the left rendered images (other than PO) 641 and the right rendered images (other than PO) 642 onto which the player object has been superimposed, are stored as the final rendering results. In the case where the player object 74 is present at more than the predetermined distance (determination reference value Dc) from the virtual cameras, images obtained by rendering all objects including the player object at one time, are stored as the final rendering results.

Next, the details of the game processing executed by the game apparatus 10 will be described with reference to FIG. 11 and FIG. 12. When the game apparatus 10 is powered on, the information processing section 31 (CPU 311) of the game apparatus 10 executes a boot-up program stored in a ROM which is not shown, thereby initializing the units such as the main memory 32. Next, a game program stored in the external memory 44 or the data storage internal memory 35 is loaded onto the main memory 32, and the CPU 311 of the information processing section 31 starts to execute the game program. In this way, processing shown in FIG. 11 is started.

Figure 11:
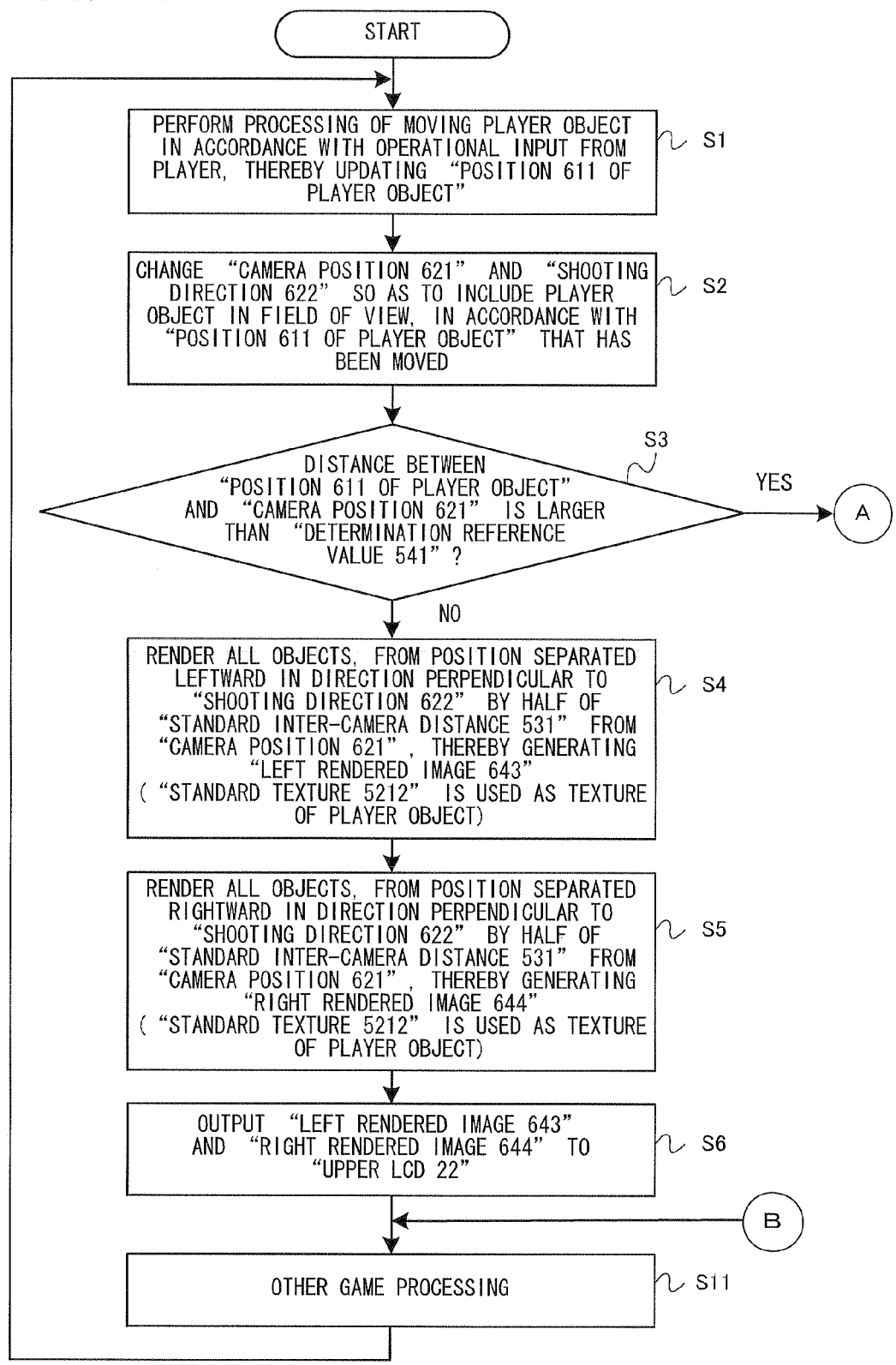
FIG. 11 is a flowchart showing the flow of processing based on the display control program.
Figure 12:
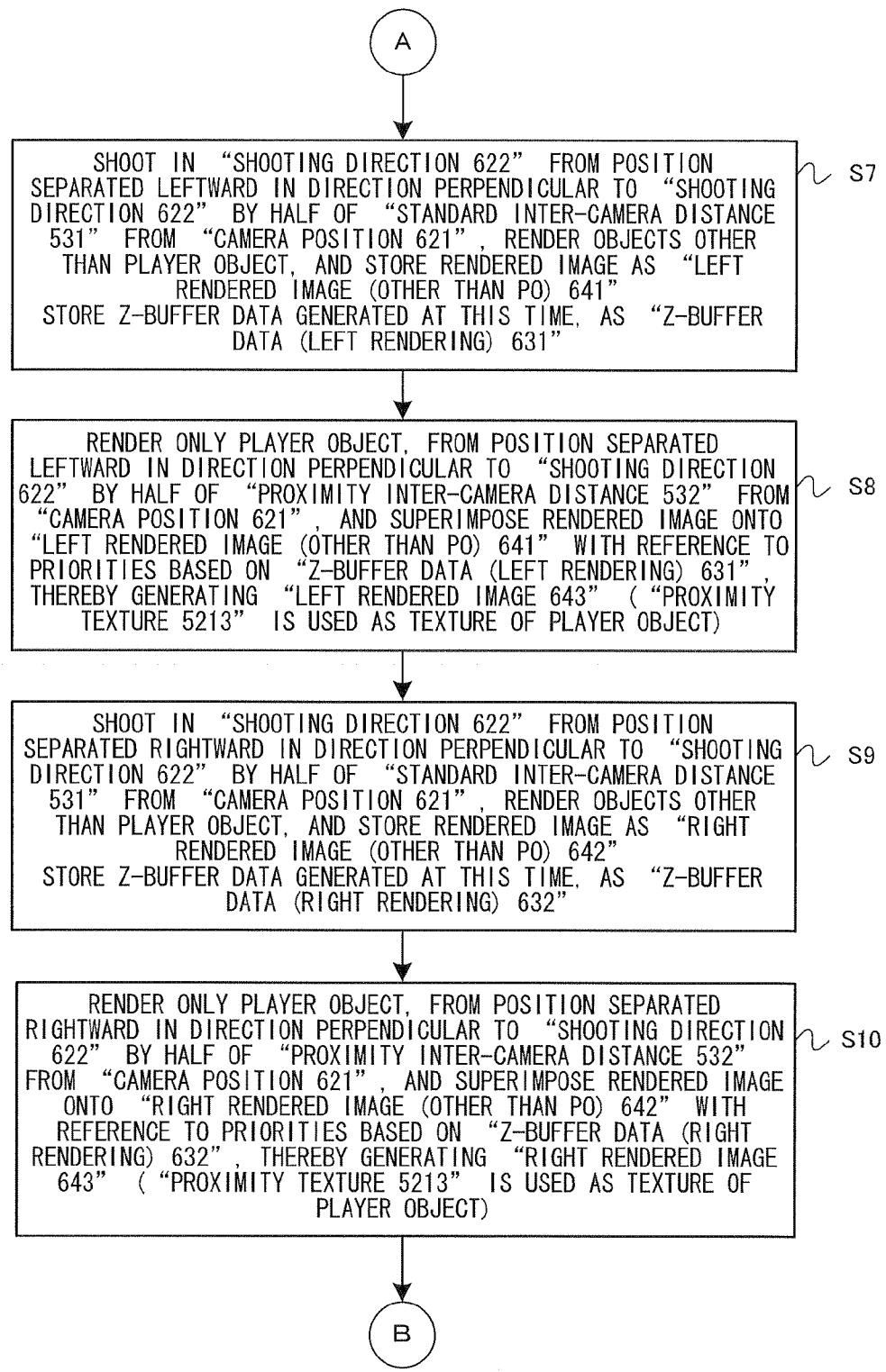
FIG. 12 is a flowchart showing the flow of processing based on the display control program.

It is noted that processing shown in FIG. 11 and FIG. 12 is merely an example The order of steps of the processing may be changed as long as the same result is obtained. In addition, the value of a variable, and a threshold value used in a determination step are also merely examples, and other values may be employed as appropriate. In addition, in the present embodiment, the CPU 311 executes the steps of processing in flowcharts shown in FIG. 11 and FIG. 12. However, a processor or a dedicated circuit may execute some of the steps of the processing in the flowcharts shown in FIG. 11 and FIG. 12.

In step S1, the CPU 311 updates the "position 611 of player object" by performing processing of moving the player object in accordance with an operational input from a player. More specifically, the CPU 311 detects operation data of the analog stick 15 and the operation buttons 14A and 14L, and performing processing of moving the player object in accordance with the operation data.

Next, in step S2, the CPU 311 changes the "camera position 621" and the "shooting direction 622" so as to include the player object in the field of view, in accordance with the "position 611 of player object" updated in step S1. More specifically, as previously described, the "camera position 621" is set at a position separated from the "position 611 of player object" by Dp described above, and the "shooting direction 622" is set at the direction from the "camera position 621" toward the "position 611 of player object" (or may be set at the direction from the "camera position 621" toward the vicinity of the "position 611 of player object", e.g., the front of the "position 611 of player object").

Next, in step S3, the CPU 311 determines whether or not the distance, in the "shooting direction 622", between the "position 611 of player object" and the "camera position 621" is larger than the "determination reference value Dc541".

If the result of the determination in step S3 is No, the process proceeds to step S4. In step S4, the CPU 311 sets the left virtual camera at a position separated leftward in the direction perpendicular to the "shooting direction 622" by the half of the "standard inter-camera distance 531" from the "camera position 621", shoots with the left virtual camera in the direction indicated by the "shooting direction 622", and renders all objects including the player object, thereby generating the "left rendered image 643". At this time, the "standard texture 5212" is used as a texture of the player object.

After step S4, in step S5, the CPU 311 sets the right virtual camera at a position separated rightward in the direction perpendicular to the "shooting direction 622" by the half of the "standard inter-camera distance 531" from the "camera position 621", shoots with the right virtual camera in the direction indicated by the "shooting direction 622", and renders all objects including the player object, thereby generating the "right rendered image 644". At this time, the "standard texture 5212" is used as a texture of the player object.

After step S5, in step S6, the CPU 311 outputs the "left rendered image 643" and the "right rendered image 644" to the upper LCD 22. After step S6, in step S11, the CPU 311 performs other game processing such as processing of moving an enemy character, battle processing, or game-over processing. After step S 11, the process returns to step S6.

If the result of the determination in step S3 is Yes, the process proceeds to step S7 shown in FIG. 12. In step S7, the CPU 311 sets the left virtual camera at a position separated leftward in the direction perpendicular to the "shooting direction 622" by the half of the "standard inter-camera distance 531" from the "camera position 621", shoots with the left virtual camera in the direction indicated by the "shooting direction 622", renders objects other than the player object, and stores the resultant image as the "left rendered image (other than PO) 641". Z-buffer data generated at this time is stored as the "Z-buffer data (left rendering) 631".

After step S7, in step S8, the CPU 311 sets the left virtual camera at a position separated leftward in the direction perpendicular to the "shooting direction 622" by the half of the "proximity inter-camera distance 532" from the "camera position 621", shoots with the left virtual camera in the direction indicated by the "shooting direction 622", and renders only the player object. At this time, with reference to the priorities in the depth direction based on the "Z-buffer data (left rendering) 631", the player object is superimposed onto the "left rendered image (other than PO) 641", the player object being drawn in a semi-transparent manner, thereby generating the "left rendered image 643". In the drawing, the "proximity texture 5213" is used as a texture of the player object.

After step S8, in step S9, the CPU 311 sets the right virtual camera at a position separated rightward in the direction perpendicular to the "shooting direction 622" by the half of the "standard inter-camera distance 531" from the "camera position 621", shoots with the right virtual camera in the direction indicated by the "shooting direction 622", renders objects other than the player object, and stores the resultant image as the "right rendered image (other than PO) 642". Z-buffer data generated at this time is stored as the "Z-buffer data (right rendering) 632".

After step S9, in step S10, the CPU 311 sets the right virtual camera at a position separated rightward in the direction perpendicular to the "shooting direction 622" by the half of the "proximity inter-camera distance 532" from the "camera position 621", shoots with the right virtual camera in the direction indicated by the "shooting direction 622", and renders only the player object. At this time, with reference to the priorities in the depth direction based on the "Z-buffer data (right rendering) 632", the player object is superimposed onto the "right rendered image (other than PO) 642", the player object being drawn in a semi-transparent manner, thereby generating the "right rendered image 644". In the drawing, the "proximity texture 5213" is used as a texture of the player object. After step S10, the process proceeds to step S11.

It is noted that in the rendering processing of steps S4, S5, S7, and S9, processing of lighting, shading, reflection mapping, and the like is performed. However, such processing is not performed in the rendering processing for the player object of steps S8 and S10. As a result, the rendered image of the player object has a single color (has an identical hue, an identical brightness, an identical colorfulness) in the entirety.

(Variation)

In the above embodiment, the upper LCD 22 is mounted in advance on the game apparatus 10. However, in other embodiments, instead of the upper LCD 22, an external stereoscopic display that can be attached to and detached from the game apparatus 10 may be used.

In addition, in the present embodiment, the upper LCD 22 is a stereoscopic display apparatus of a parallax barrier type. However, in other embodiments, the upper LCD 22 may be a stereoscopic display apparatus of any other type such as lenticular lens type. For example, if a stereoscopic display apparatus of a lenticular lens type is used, an image for a left eye and an image for a right eye may be combined with each other by the CPU 311 or another processor, and the resultant composite image may be supplied to the stereoscopic display apparatus of a lenticular lens type.

In addition, in the above embodiment, the stereoscopic image display processing is executed in the game processing by the game apparatus 10. However, in other embodiments, the stereoscopic image display processing may be executed by any information processing apparatus or any information processing system (for example, a PDA (Personal Digital. Assistant), a mobile phone, a personal computer, or a camera).

In addition, in the above embodiment, the game processing (stereoscopic image display processing) is executed by using only one information processing apparatus (game apparatus 10). However, in other embodiments, a plurality of information processing apparatuses, included in a stereoscopic image display system, that can communicate with each other may execute the respective parts of the stereoscopic image display processing.

What is claimed is:

1. A non-transitory computer-readable storage medium having stored therein a display control program that, when executed, causes a computer to function as:
    a display controller configured to, based on respective viewpoints of a pair of virtual cameras in a virtual space, generate an image for a right eye and an image for a left eye of the virtual space, and output the image for the right eye and the image for the left eye to a display in a stereoscopically visible manner, the display controller generates an image for the right eye and an image for the left eye of a proximity object, which is a virtual object present in the virtual space at less than a predetermined distance from the virtual cameras, such that the proximity object is displayed in a simplified manner from when the virtual object is present in the virtual space at greater than the predetermined distance from the virtual cameras.

2. The non-transitory computer-readable storage medium having stored therein the display control program according to claim 1, wherein
the display controller performs the generation and the output so as to decrease the difference between the display positions on the display of the image for the right eye and the image for the left eye of the proximity object.

3. The non-transitory computer-readable storage medium having stored therein the display control program according to claim 2, wherein the display controller
generates, by using the pair of virtual cameras having a first interval therebetween, an image for the right eye and an image for the left eye of a non-proximity object which is a virtual object present at more than the predetermined distance from the virtual cameras, and
generates, by using the pair of virtual cameras having a second interval smaller than the first interval therebetween, the image for the right eye and the image for the left eye of the proximity object, thereby decreasing the difference between the display positions.

4. The non-transitory computer-readable storage medium having stored therein the display control program according to claim 1, wherein the display controller,
when a predetermined virtual object is present at less than the predetermined distance from the virtual cameras, displays the predetermined virtual object in the simplified manner, and
when a virtual object other than the predetermined virtual object is present at less than the predetermined distance from the virtual cameras, does not display the virtual object other than the predetermined virtual object in the simplified manner.

5. The non-transitory computer-readable storage medium having stored therein the display control program according to claim 2, wherein the display controller when a predetermined virtual object is present at less than the predetermined distance from the virtual cameras, performs processing for decreasing the difference between the display positions of the image for the right eye and the image for the left eye of the predetermined virtual object, and
when a virtual object other than the predetermined virtual object is present at less than the predetermined distance from the virtual cameras, does not perform processing for decreasing the difference between the display positions of the image for the right eye and the image for the left eye of the predetermined virtual object.

6. The non-transitory computer-readable storage medium having stored therein the display control program according to claim 3, wherein
the display controller, when a predetermined virtual object is present at less than the predetermined distance from the virtual cameras,
generates, by using the pair of virtual cameras having the first interval therebetween, an image for the right eye and an image for the left eye of a virtual object other than the predetermined virtual object, and
superimposes respective images of the predetermined virtual object that are generated by the pair of virtual cameras having the second distance therebetween, onto the image for the right eye and the image for the left eye, by using respective pieces of depth information about the image for the right eye and the image for the left eye, generated by the generation of the image for the right eye and the image for the left eye.

7. The non-transitory computer-readable storage medium having stored therein the display control program according to claim 1, wherein the display controller generates the image for the right eye and the image for the left eye of the proximity object as semi-transparent images.

8. The non-transitory computer-readable storage medium having stored therein the display control program according to claim 4, wherein
a player object that is operated by a player is present in the virtual space,
the display controller sets a viewpoint and a direction of line of vision, based on the position of the player object in the virtual space, thereby generating an image including the player object, and
the predetermined virtual object is the player object.

9. The non-transitory computer-readable storage medium having stored therein the display control program according to claim 2, wherein the controller performs processing for making the parallax of the proximity object zero.

10. The non-transitory computer-readable storage medium having stored therein the display control program according to claim 1, wherein the display controller sets the predetermined distance to be a distance that allows an object to appear to protrude from the display.

11. The non-transitory computer-readable storage medium having stored therein the display control program according to claim 1, wherein displaying an object in the simplified manner is displaying the object as a silhouette.

12. A display control system comprising
a display;
a display controller configured to, based on respective viewpoints of a pair of virtual cameras in a virtual space, generate an image for a right eye and an image for a left eye of the virtual space, and output the image for the right eye and the image for the left eye to the display in a stereoscopically visible manner,
the display controller generating an image for the right eye and an image for the left eye of a proximity object, which is a virtual object present in the virtual space at less than a predetermined distance from the virtual cameras in the virtual space, such that the proximity object is displayed in a simplified manner from when the virtual object is present in the virtual space at greater than the predetermined distance from the virtual cameras.

13. A display control apparatus comprising a display controller configured to:
generate, based on a pair of virtual cameras in a virtual space, an image for a right eye and an image for a left eye of the virtual space;
generate an image for a right eye and an image for a left eye of a proximity object, which is a virtual object present at less than a predetermined distance from the virtual cameras in the virtual space, such that the proximity object is displayed in a simplified manner from when the virtual object is present in the virtual space at greater than the predetermined distance from the virtual cameras; and
output the generated images of the virtual space and the generated images of the proximity object to a display in a stereoscopically visible manner.

14. A display control method for controlling a display control apparatus or a display control system, the display control method comprising when an image for a right eye and an image for a left eye of a virtual space in which a predetermined virtual object is present are generated based on a pair of virtual cameras in the virtual space, and the image for the right eye and the image for the left eye are outputted to a display in a stereoscopically visible manner, generating an image for the right eye and an image for the left eye of a proximity object, which is a virtual object present at less than a predetermined distance from the virtual cameras, such that the proximity object is displayed in a simplified manner from when the virtual object is present in the virtual space at greater than the predetermined distance from the virtual cameras.

15. The display control method of claim 14, further comprising displaying the images of the proximity object such that the proximity object is displayed in the stereoscopically visible manner with the proximity object appearing to protrude from the display.

16. The display control method of claim 14, further comprising displaying the images of the proximity object such that the proximity object is displayed in the stereoscopically visible manner with the proximity object appearing to retract backward from the display.

17. The non-transitory computer-readable storage medium having stored therein the display control program according to claim 1, wherein displaying the proximity object in the simplified manner includes displaying the proximity object with a texture that is simplified from a texture used when the virtual object is present at greater than the predetermined distance from the virtual cameras.

18. The non-transitory computer-readable storage medium having stored therein the display control program according to claim 1, wherein the display controller is further configured to generate images for another virtual object that is displayed in a same manner when the another virtual object is present in the virtual space at less than the predetermined distance from the virtual cameras and when the another virtual object is present in the virtual space at greater than the predetermined distance from the virtual cameras.

19. The non-transitory computer-readable storage medium having stored therein the display control program according to claim 1, wherein the predetermined distance is a stereoscopic view reference distance at which the difference between the display position of an image for the right eye and the display position of an image for the left eye on the display is zero.

* * * * *